(12) United States Patent
Ogawa et al.

(10) Patent No.: US 6,795,041 B2
(45) Date of Patent: Sep. 21, 2004

(54) MIXED REALITY REALIZING SYSTEM

(75) Inventors: Kenji Ogawa, Osaka (JP); Toshiro Saeki, Osaka (JP); Haruyo Tamura, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 242 days.

(21) Appl. No.: 10/189,127

(22) Filed: Jul. 2, 2002

(65) Prior Publication Data
US 2004/0004583 A1 Jan. 8, 2004

(51) Int. Cl.7 .................................................. G09G 5/00
(52) U.S. Cl. ................... 345/7; 345/8; 345/9; 348/222; 359/13; 349/11
(58) Field of Search ...................... 345/7, 8, 9; 348/222, 348/115; 359/13; 349/11

(56) References Cited

U.S. PATENT DOCUMENTS 5,844,824 A * 12/1998 Newman et al. ............ 345/156
6,587,783 B2 * 7/2003 Navab et al. ................ 701/200
2002/0196343 A1 * 12/2002 Navab et al. ................ 348/169

FOREIGN PATENT DOCUMENTS

| JP | 08160879 A | 6/1996 |
| JP | 09114543 A | 5/1997 |

* cited by examiner

Primary Examiner—Jimmy H. Nguyen
(74) Attorney, Agent, or Firm—D. Peter Hochberg; Sean Mellino; Katherine R. Vieyra

(57) ABSTRACT

According to a mixed reality realizing system of the present invention, when a viewer wears a head mount display (HMD) including a video display and a CCD camera, and views an exhibit using an optical see-through type system, identification signals and position signals transmitted from infrared LEDs located around the exhibit are received to determine a position of the exhibit, and to superimpose contents such as explanations of the exhibit, which have been stored in advance in a portable computer, on a predetermined position on the video display where the exhibit is displayed.

3 Claims, 4 Drawing Sheets

MIXED REALITY REALIZING SYSTEM

TECHNICAL FIELD OF INVENTION

The present invention relates to a mixed reality realizing system for use in exhibition facilities like a museum for example, which provides viewers with information on exhibits together with the exhibits they are viewing, by integrating a virtual space with a real space.

BACKGROUND OF THE INVENTION

In displaying excavated clay pots at a museum, for example, it is desirable to present to viewers not only exhibits themselves but with information on the exhibits, such as excavated places, conditions of excavation and the like.

Conventionally, in response to such a demand, explanatory panels have been installed or voice guidance systems have been employed to provide relevant information.

In recent year, following the advance in technology of microprocessors, such an electronic guidance system has been developed that uses a portable-type information terminal device or a personal digital assistant (PDA) for combining voices and images to provide viewers with desired information in an interactive manner.

However, when conventional explanatory panels are used, it is very difficult to provide pertinent information corresponding to interests of viewers in an interactive manner, because there are physical restrictions to sizes of the panels, space for placement of the panels and soon. When voice guidance systems are used, there are no physical restrictions but it is impossible to provide visual information such as pictures, images and so on. Consequently, it is impossible to expect such display effects as providing viewers with reality sense and immersion sense.

Contrary to these, the electronic guidance system using the PDA is capable of providing viewers with interactive information corresponding to their interests by combining voices and images. Therefore, this system is considered to be the best one in the present circumstances.

However, when the electronic guidance system is utilized, viewers have to bother to hold the PDA with both hands to operate it, inconveniencing the operation thereof, besides there is difference in display position between an exhibit itself and its image projected by the PDA, necessitating the viewers to frequently move their sight lines between the exhibit and the PDA. Thus, a problem is posed that the viewers cannot afford to fully enjoy appreciating the exhibit.

DISCLOSURE OF THE INVENTION

Therefore, the present invention has an object to provide a mixed reality realizing system capable of producing a display effect of giving reality sense and immersion sense.

In order to achieve this object, the mixed reality realizing system of the present invention comprises identification signal transmitters located around a target object to transmit identification signals of the target object, a plurality of position indicators for indicating a position of the target object, and a portable type terminal device comprising a head mount display (HMD), a controller and a computer, wherein the head mount display of the portable type terminal device comprises: a video display; an identification signal receiver for receiving the identification signals of the target object transmitted from the identification signal transmitters; and a camera for shooting the plurality of position indicators, and the computer comprises: a storage for storing, in advance, data including coordinate positions of the plurality of position indicators on an image shot by the camera from a reference position previously determined based on the target object and contents relating to the target object; a control operation unit for receiving the signals from the identification signal receiver and retrieving the contents relating to the target object from the storage; a coordinate position recognizing unit for recognizing, in real time, coordinate positions of the plurality of position indicators on the image shot by the camera; a position-information operation unit for calculating a visible position and a real position of the target object based on the plurality of coordinate positions obtained from the position indicators; and a content superimposing unit for superimposing the contents relating to the target object on the video display of the head mount display based on the information on the plurality of positions obtained from the position-information operation unit, the contents having been registered in advance in the storage, and wherein the position-information operation unit calculates a difference between each coordinate position of the position indicator on the image registered in advance in the storage of the computer, and a coordinate position recognized in real time by the coordinate position recognizing unit, thereby to superimpose in real time the contents relating to the target object on the target object based on the calculation result.

According to the foregoing, the HMD associated with the portable type terminal device is provided with the camera for shooting the position indicators placed around the target object on a vertical plane to effect superimposed display by positioning the contents relating to the target object on a real image of the target object in real time, so that without using a special three dimensional position-and-attitude sensor-or the like, that is to say, with only such a simple arrangement as the position indicator and the camera combined, it is possible to provide a viewer with interactive information full of rich sources in which the target object and its related contents are integrated together. Thus, it is possible to give an advanced immersion sense to the viewer, as well as to enhance the effect of exhibition when the target object is an exhibit, for example.

Further, according to a preferred embodiment of the present invention, used as the head mount display of the mixed reality realizing system is an optical see-through type head mount display which includes a half mirror for permeating a reflected light from the target object toward a visible position of the target object, and which does not output a background image shot by the camera to the video display.

Still further, according to the preferred embodiment of the present invention, used as the head mount display of the mixed reality realizing system is a video see-through type head mount display which includes a both-sided mirror located midway along a reflected light course from the target object toward the visual position, for refracting a reflected light from the target object in other directions than the one toward the visual position, and which outputs a background image shot by the camera to the video display.

A number of characteristic features and effects of the present invention will be clarified by the preferred embodiment described below with reference to annexed drawings.

DESCRIPTION OF PREFERRED EMBODIMENTS

Figure 1:
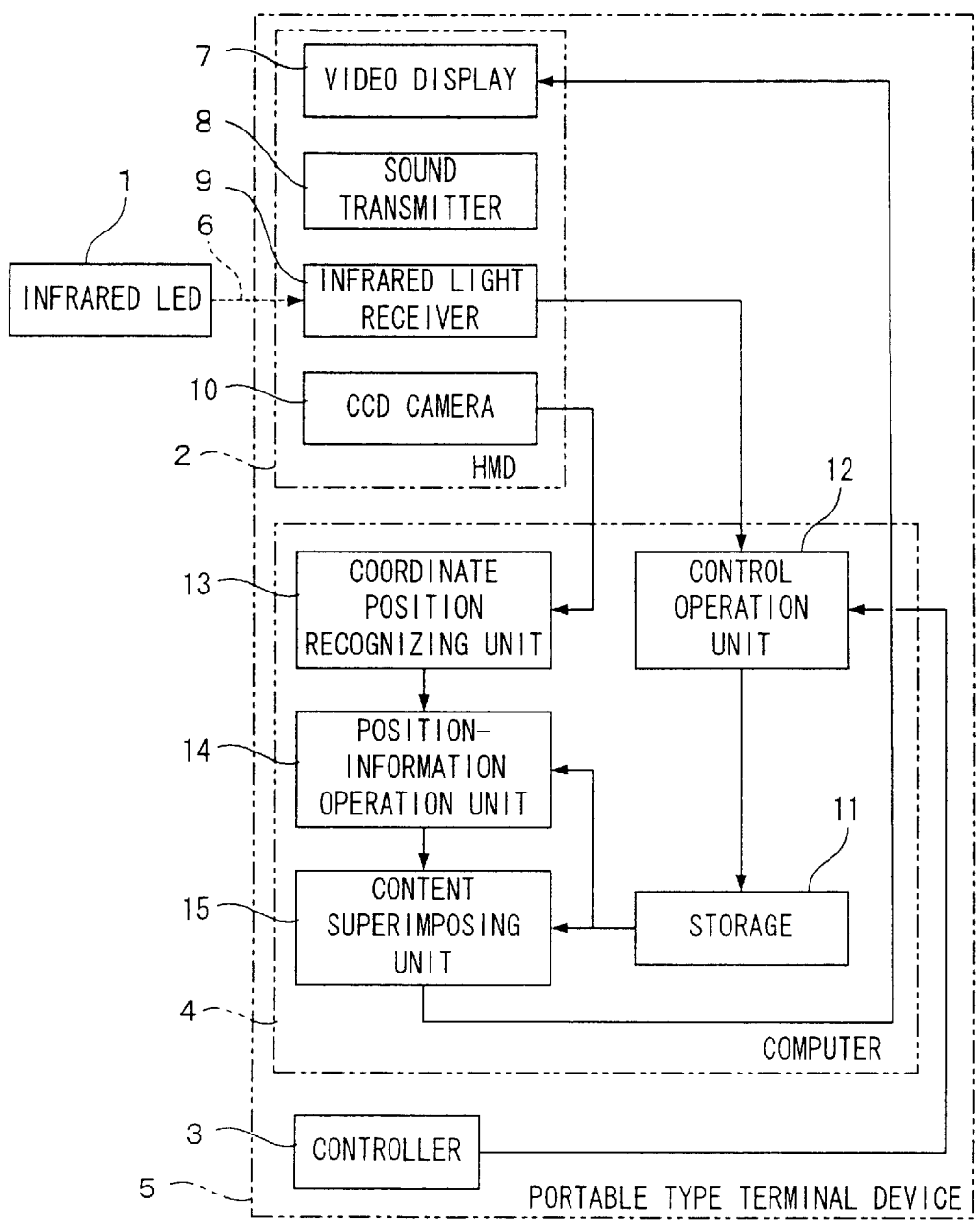
FIG. 1 is a block diagram schematically showing a mixed reality realizing system according to a preferred embodiment of the invention.

As shown in FIG. 1, a mixed reality realizing system of the invention comprises four infrared LEDs 1 located around an exhibit (an example of a target object) in a vertical plane including the exhibit, and a portable type terminal device (for example, one which is wearable on a body or one which can be carried in a pocket) 5 comprising a single eye type head mount display (hereinafter, referred to as HMD) 2, a controller 3 and a computer 4. Each infrared LED 1 is used as an identification signal transmitter for transmitting an identification signal 6 of an exhibit to identify the exhibit, and also as a position indicator for indicating a position of the exhibit. At least one infrared LED 1 is required as the identification signal transmitter, and at least three infrared LEDs are required as the position indicator. If one out of three infrared LEDs used as position indicators is used also as an identification signal transmitter, it may be enough to provide total three infrared LEDs. Thus, by using infrared LEDs, one LED can be used in common as the identification signal transmitter and as the position indicator. As a matter of course, the identification signal transmitter and the position indicator may be used separately as different devices.

The HMD 2 of the portable type terminal device 5 comprises a video display (a liquid crystal or CRT display may be used) 7, a sound transmitter (an ear phone is generally used but a small-size speaker may be used) 8, an infrared light receiver 9 for receiving an infrared light identification signal 6 transmitted from the infrared LED 1 to identify a specific exhibit, and a CCD camera (an example of shooting means, and a CMOS camera may be used instead) 10 for shooting a plurality of infrared LEDs 1. The infrared light receiver 9 represents an example of the identification signal receiver. When a light used in common for both the position indicator and the identification signal transmitter is other than an infrared light, a filter is provided for passing only light waves having the same wave length as of the light emitted from a light source, so that the light serving as the identification signal can be recognized and the position-indicating light of the position indicator can be recognized by performing the same image processing as for the case where the infrared light is used.

Figure 2:
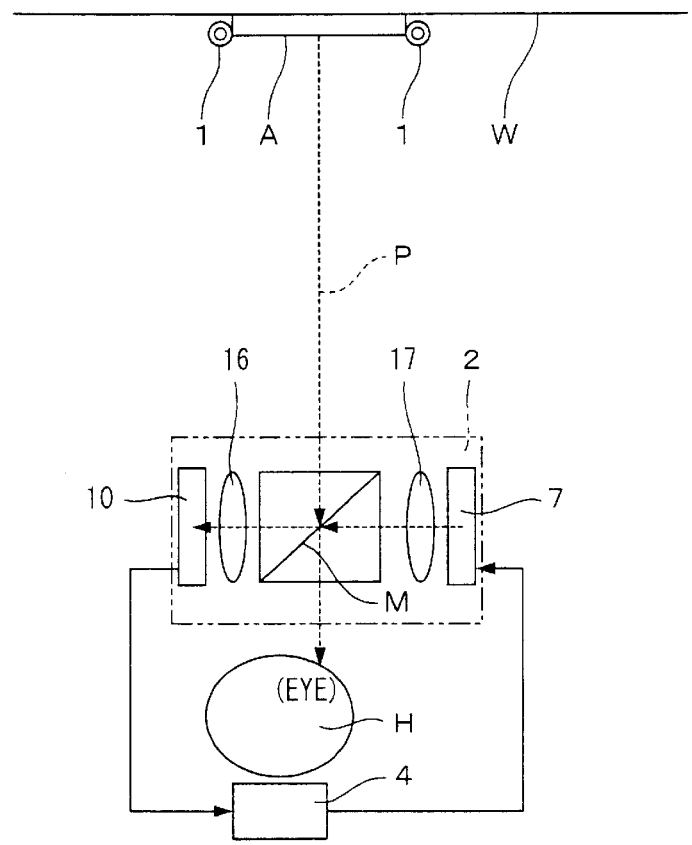
FIG. 2 is a plan view illustrating an optical positional relationship of an HMD in the system.

The CCD camera 10, as shown in FIG. 2, is mounted on the HMD 2 to allow shooting a back ground that is the same as what a viewer H sees through the HMD 2, and as the HMD 2 mounted with this CCD camera 10, either one of an optical see-through type display or a video-see-through type display may be used.

In the optical see-through type HMD 2, a mirror M mounted to the HMD 2 is a half mirror. In this case, as shown in FIG. 2, the half mirror M is placed at a position on a reflected light P toward an eye of the viewer H from an exhibit A displayed vertically on a vertical plane (wall surface) W, and the CCD camera 10 and the video display 7 are optically placed on both sides of the half mirror M through lenses 16 and 17, respectively.

According to this optical see-through type HMD 2, the background image shot by the CCD camera 10 is not output to the video display 7. Yet, it is indispensable to shoot the infrared LED 1 by the CCD camera 10 to determine the display position and size of a superimposition image to be displayed on the video display 7.

In the video-see-through type HMD 2, a mirror M mounted to the HMD 2 is a both sided mirror. That is, the reflected light P toward the eye of the viewer H from the exhibit A displayed in a vertical posture on a vertical plane W is refracted at an right angle by the both sided mirror M when the background image is shot by the CCD camera 10, and the background image thus shot is output to the video display 7 and is superimposed with a predetermined superimposition image. In this video-see-through type HMD 2, too, it is indispensable to shoot the infrared LED 1 by the CCD camera 10 to determine the display position and size of a superimposition image to be displayed on the video display 7.

The computer 4 of the portable type terminal device 5 comprises a storage 11 for registering in advance contents (this sort of contents includes various kinds of data such as technical data, and may simply be called information) including images, explanatory sentences, sounds and so on, all relating to an exhibit, and data (hereinafter called as reference coordinate data, which will be described later) including a coordinate position on an image of the infrared LED 1 shot by the CCD camera 10 from a reference position predetermined by the exhibit; a control operation unit 12 for receiving a signal from the infrared light receiver 9 and retrieving from the storage 11 the contents relating to the exhibit such as images, explanatory sentences, sounds and so on; a coordinate position recognizing unit 13 for recognizing in real time a coordinate position of the infrared LED 1 on an image shot by the CCD camera 10; a position-information operation unit 14 for calculating, based on the recognized coordinate data, a visible position of the exhibit by a viewer wearing the HMD 2 of the portable type terminal device 5 and a position of the exhibit; and a content superimposing unit 15 for superimposing the contents relating to the exhibit on a real image of the exhibit on the video display 7 of the HMD 2 by adjusting, based on the position information, the images or explanatory sentences relating to the exhibit which have been retrieved from the storage 11 by the control operation unit 12 to the position of the real image of the exhibit on the video display 7. Incidentally, the storage 11 may be placed outside by adding a communication function.

Next, a method for realizing a mixed reality in a museum, for example, by using a system of the above-stated system will be described with reference to FIGS. 3 to 5 and a flow chart in FIG. 6.

Figure 3:
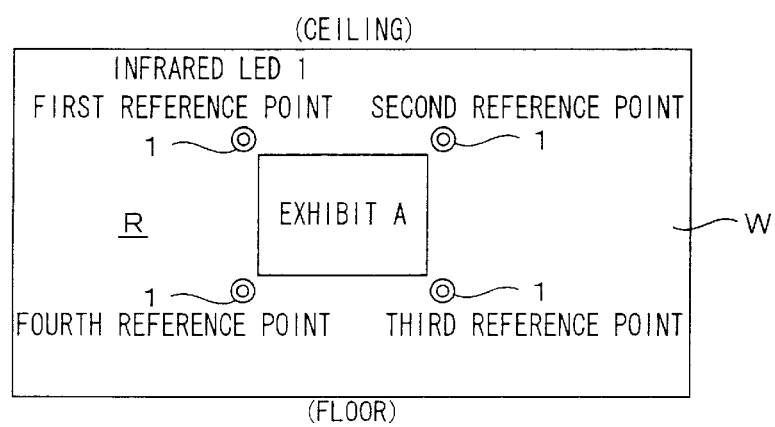
FIG. 3 is an elevation illustrating an example for realizing a mixed reality for a planar exhibit by using the system.
Figure 4:
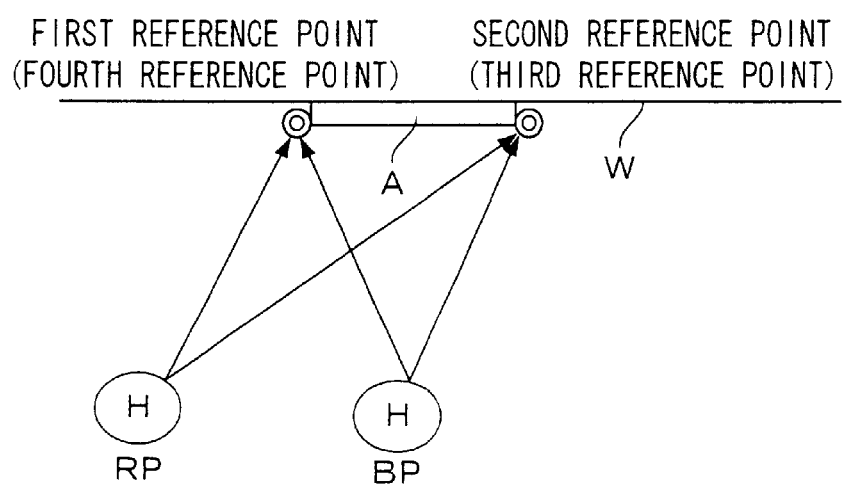
FIG. 4 is a plan view illustrating the same example.

As shown in FIG. 3 and FIG. 4, an identification signal 6 of an exhibit A is transmitted from one of four infrared LEDs 1 located at four corners of the exhibit A and on a same vertical plane W as the exhibit A hanged in a vertical posture on this vertical plane W which is a wall in an exhibition room R. Here, a position outside and close to the upper left corner of the exhibit A where one infrared LED 1 is located is defined as first reference point, and positions where other three infrared LEDs 1 are located are defined as second, third, and fourth reference points clockwise.

When an identification signal 6 transmitted from one of the infrared LEDs 1 is received by the infrared light receiver 9 of the HMD 2 (step S21), an output signal from this infrared light receiver 9 is output to the control operation unit 12 in the computer 4.

Then, this control operation unit 12 operates to retrieve from the storage 11 the contents such as images, explanatory sentences or voices all relating to the exhibit and the reference coordinate data (step S22), and the retrieved reference coordinate data is sent to the position-information operation unit 14 while the contents are sent to the content superimposing unit 15 (steps S23, S24).

Figure 5:
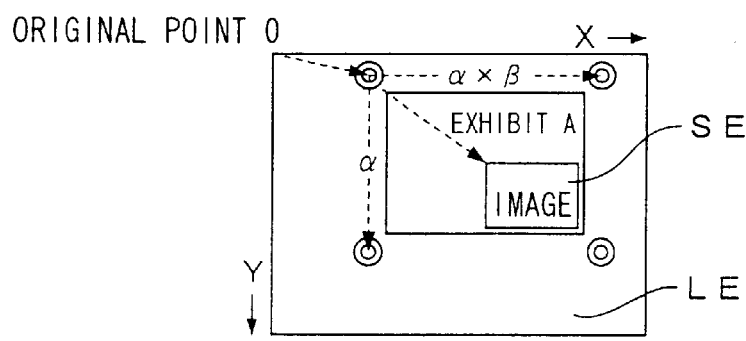
FIG. 5 shows an image viewed by the HMD of the system.
Figure 6:
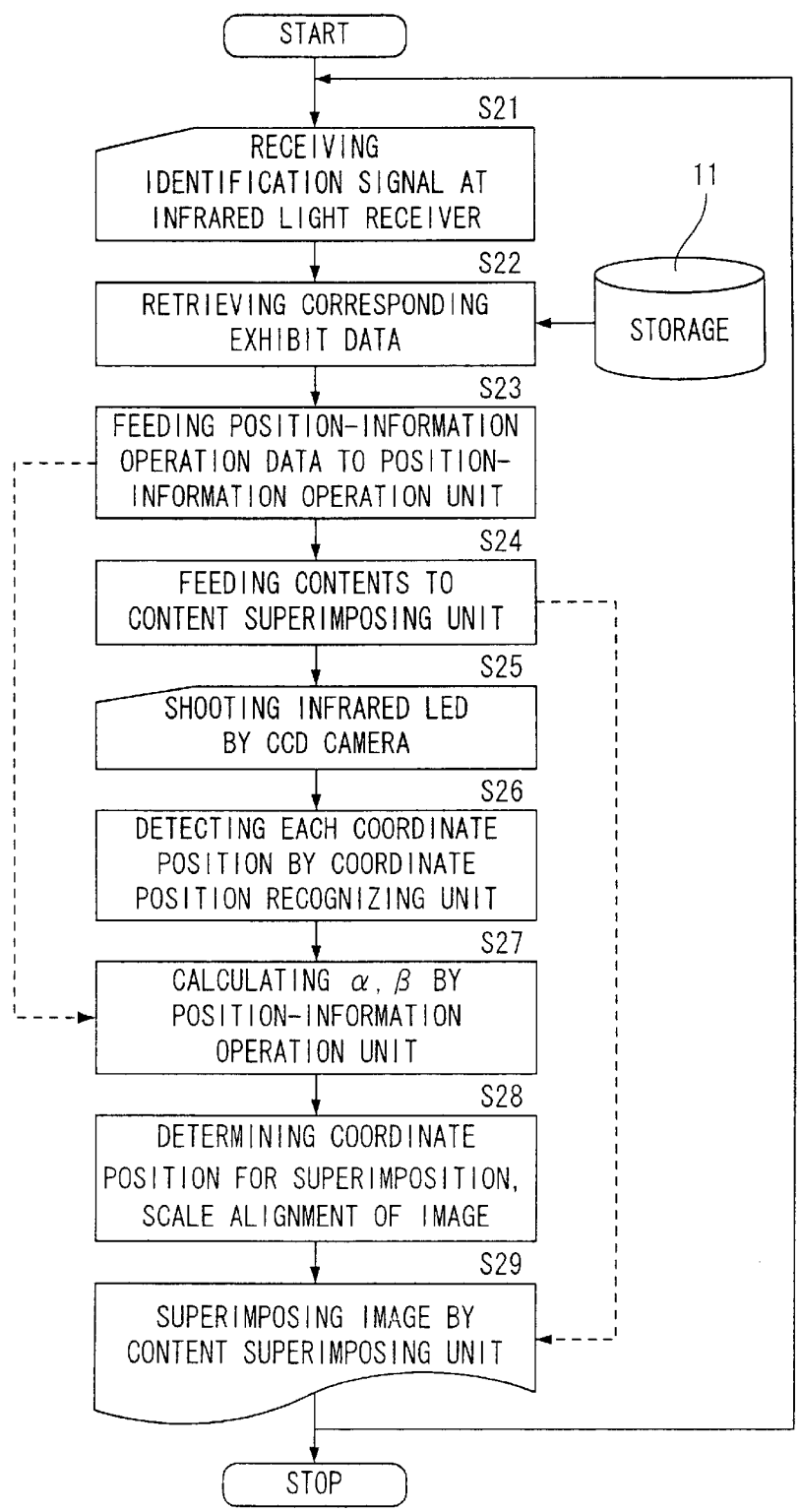
FIG. 6 is a flow chart showing operating processes by the system.

The above mentioned reference coordinate data includes, as shown in FIG. 4, distances between the first and fourth reference points (or the second and third reference points) and between the first and second reference points on an image of the infrared LED 1 shot by the CCD camera 10 of the HMD 2 from a reference position BP determined in accordance with the exhibit A, and, as shown in FIG. 5, a coordinate position for superimposing an image SE relating to the exhibit A (a coordinate position in the upper left corner of the image SE when the upper left corner of an image LE shot by the CCD camera 10 from the reference position BP is defined as original point 0).

Then, in the coordinate position recognizing unit 13 of the computer 4, four infrared LEDs 1 are shot by the CCD camera 10 of the HMD 2 from a real visible position RP which is selected arbitrarily by the viewer H wearing the portable type terminal device 5 (step S25), and a coordinate position is obtained on the image LE of the four infrared LEDs thus shot by the CCD camera (the upper left corner of the image is determined as original point) (step S26). From these coordinate points, each distance on the image between the first and the fourth reference points (or the second and the third reference points) and between the first and the second reference points are obtained.

Subsequently, in the position-information operation unit 14 of the computer 4, the obtained distances are compared with those distances which have been obtained in advance by the shooting from the reference position BP, respectively between the first and the fourth reference points (or the second and the third reference points) and between the first and the second reference points, whereby the position information on the viewer H relative to the exhibit A, that is to say a distance and an angle, is calculated.

More specifically, the distance measured in advance between the first and the fourth reference points (or the second and the third reference points) is normalized as "1" to calculate the ratio scale (percentage) of the distance $\alpha$ measured between the first and the fourth reference points (or the second and the third reference points) based on the shooting from the real visible position RP of the viewer H, to the normalized distance. In the same manner, the distance measured in advance between the first and the second reference points is normalized as "1" to calculate the ratio scale (percentage) of the distance $\alpha \times \beta$ measured between the first and the second reference points based on the shooting from the real visible position RP of the viewer H, to the normalized distance (step S27). Incidentally, when it is impossible to shoot the fourth reference point due to existence of other viewers, the distance $\alpha$ may be calculated from the length between the second and the third reference points.

Then, in the content superimposing unit 15 of the computer 4, a coordinate position is determined for superimposing the image SE relating to the exhibit on the image LE which has been shot from the real visible position RP of the viewer H, and scale alignment of the image SE is performed (step S28). Thereafter, the image SE is superimposed on the exhibit A (step S29).

Particularly, in a first place, difference between a coordinate position at the first reference point shot from the real visible position RP of the viewer H and a coordinate position of the first reference point shot from the reference position BP is calculated, and a coordinate position (a coordinate position on the image shot from the reference position BP) at the upper left corner of the image SE for superimposition is translated by the amount of the difference.

Next, difference between the coordinate position at the upper left corner of the image SE, which has been translated, and the coordinate position at the first reference point shot from the real visible position RP of the viewer H is calculated. Then, a Y component (Y represents a vertical direction) of the difference is multiplied by a times, and a X component (X represents a horizontal direction) of the difference is multiplied by $\alpha \times \beta$ times, thereby to determine the coordinate position of the image SE at its upper left corner with respect to the first reference point shot from the real visible position RP of the viewer H.

Finally, images registered in advance in the storage 11 are multiplied by a times in both X and Y directions, and further multiplied by $\beta$ times in the X direction. Thereafter, the image SE is adjusted so that its coordinate position at the upper left corner corresponds to the coordinate position determined as mentioned above. Thus, the image SE is superimposed in real time on the image LE.

Here, if the viewer H approaches to the exhibit A and the infrared LED 1 shot by the CCD camera 10 is caused to run off the edge of the image LE, the superimposed image before such running off the edge is kept and put into stand-by.

Further, in the embodiment mentioned above, the image SE for superimposition is displayed at a position which comes within a range of the exhibit A, but it is not necessarily restricted to it. It is possible to display the image SE at a position which is not overlapping the exhibit A.

In other words, a display position changing unit (display position changing means) is provided for changing a display position of an image so that a "reference position" for determining a coordinate position at the upper left corner of the image, that is, a "reference position of display" may be changed to a second reference position by this display position changing unit. In this consequence, the display position of the image for superimposition may deviate from within the range of an exhibit to an outside space on the right.

In this case, too, it is possible to use the above mentioned $\alpha$ and $\beta$ to express the image SE for superimposition as if the image SE follows the same size variation as that of the exhibit A which varies in size according to a visual position.

Further, in the embodiment described above, the exhibit hanged on the vertical plane has a planar form, but it is possible to realize the same mixed reality as the above described one by setting a virtual vertical plane for a three dimensional exhibit placed in a free space and locating an infrared LED 1 at each four corners of the exhibit. Further, by applying three dimensional graphics to the image SE for superimposition, it becomes possible to superimpose a three dimensional image on a three dimensional exhibit. Furthermore, regardless of presence/absence of an image for superimposition, various guidance, explanations and the like may be transmitted from a sound transmitter, allowing a viewer to have a deeper immersion sense.

In addition, although the system of the present invention is aimed to realize a mixed reality in association with each exhibit in cultural facilities such as a museum, it is contemplated that the system may be applied in different fields such as for inspections of various industrial machines and apparatuses, and medical diagnoses, as well as in the fields of education, entertainment and so forth. That is to say, a target object of the system may be just anything as far as reference information thereon may be provided.

What is claimed is:

1. A mixed reality realizing system, comprising identification signal transmitters located around a target object to transmit identification signals of the target object, a plurality of position indicators for indicating a position of the target object, and a portable type terminal device comprising a head mount display, a controller and a computer, the head mount display of said portable type terminal device comprising:
a video screen;
an identification signal receiver for receiving the identification signals of the target object transmitted from the identification signal transmitters; and
a camera for shooting the plurality of position indicators, the computer comprising:
a storage for storing, in advance, data including coordinate positions of the plurality of position indicators on an image shot by the camera from a reference position previously determined based on the target object and contents relating to the target object;
a control operation unit for receiving the signals from the identification signal receiver and retrieving the contents relating to the target object from the storage;
a coordinate position recognizing unit for recognizing, in real time, coordinate positions of the plurality of position indicators on the image shot by the camera;
a position-information operation unit for calculating a visible position and a real position of the target object based upon the plurality of coordinate positions obtained from the position indicators; and
a content superimposing unit for superimposing the contents relating to the target object on the target object on the video display of the head mount display based on the information on the plurality of positions obtained from the position-information operation unit, the contents having been registered in advance in the storage, wherein the position-information operation unit calculates a difference between each coordinate position of the position indicator on the image registered in advance in the storage of the computer, and a coordinate position recognized in real time by the coordinate position recognizing unit, thereby to superimpose in real time the contents relating to the target object on the target object based on the calculation result.

2. The mixed reality realizing system as defined in claim 1, wherein an optical see-through type system is used as the head mount display, the optical see-through type system including a half mirror for permeating a reflected light from the target object toward a visible position of the target object, and outputting no background image shot by the camera to the video display.

3. The mixed reality realizing system as defined in claim 1, wherein a video see-through type system is used as the head mount display, the video see-through type system including a both-sided mirror located on a reflected light course from the target object toward the visible position of the target object to allow the reflected light from the target object to refract in other directions than the one toward the visible position, and outputting a background image shot by the camera to the video display.

* * * * *